(12) United States Patent
Falkner (10) Patent No.: US 6,481,456 B1
(45) Date of Patent: Nov. 19, 2002

(54) LIQUID TREATMENT APPARATUS AND FLOAT VALVE THEREFOR

(76) Inventor: Kemp E. Falkner, 427 Camelia Trail, St. Augustine, FL (US) 32086

( * ) Notice: Subject to any disclaimer, the term of this patent is extended or adjusted under 35 U.S.C. 154(b) by 0 days.

(21) Appl. No.: 09/965,577

(22) Filed: Sep. 28, 2001

(51) Int. Cl.⁷ .............................................. F16K 24/04
(52) U.S. Cl. ....................... 137/206; 137/202; 137/210; 210/123
(58) Field of Search ................. 137/202, 206, 137/210, 211; 210/123

(56) References Cited

U.S. PATENT DOCUMENTS

| | | | | |
|---|---|---|---|---|
| 1,090,244 A | * | 3/1914 | Staples ........................ 137/209 |
| 2,711,465 A | * | 6/1955 | Sanborn ....................... 137/209 |
| 3,786,829 A | * | 1/1974 | Nardo et al. ................ 137/202 |
| 3,915,860 A |   | 10/1975 | Priest ........................ 210/136 |
| 4,412,924 A |   | 11/1983 | Feather ....................... 210/744 |
| 4,889,623 A |   | 12/1989 | Prior et al. ................. 210/190 |
| 4,966,692 A |   | 10/1990 | Overy ........................ 210/123 |
| 5,485,865 A | * | 1/1996 | Shirk ......................... 137/206 |
| 5,865,995 A |   | 2/1999 | Nelson ....................... 210/205 |
| 5,901,734 A | * | 5/1999 | Kucera ....................... 137/202 |
| 5,968,352 A |   | 10/1999 | Ditzler ....................... 210/220 |
| 6,026,842 A | * | 2/2000 | Gallant ....................... 137/202 |
| 6,080,306 A | * | 6/2000 | Falkner ....................... 210/123 |
| 6,103,108 A |   | 8/2000 | Kohlenberg ................ 210/120 |
| 6,158,456 A |   | 12/2000 | Enge ........................... 137/202 |

* cited by examiner

Primary Examiner—Gerald A. Michalsky
(74) Attorney, Agent, or Firm—Charles M. Kaplan (57) ABSTRACT

A float control valve for liquid treatment apparatus is located sufficiently far above the level of the liquid being treated that forces created by the liquid, or forces created during movement of the apparatus, do not harm the control valve or interfere with its functioning.

18 Claims, 10 Drawing Sheets

LIQUID TREATMENT APPARATUS AND FLOAT VALVE THEREFOR

BACKGROUND OF THE INVENTION

This invention relates to liquid treatment apparatus, and more particularly to the control of the captive pressurized air volume in liquid treatment tanks. Control valves using the position of a float in a liquid being treated do not always operate reliably when the liquid is being treated at a relatively high pressure (e.g. above 50 psi). Prior art valves of this type frequently sputter air and the liquid being treated when they vent the treatment tanks to the atmosphere. Also, when the float itself is located at or closely adjacent the level of a liquid being treated, currents and movement of the liquid may interfere with the movement of the float and cause the control mechanism to malfunction; short cycling of a pressure pump activated by the control mechanism may also occur.

OBJECTIVES OF THE INVENTION

Accordingly, it is an object of this invention to provide improved liquid treatment apparatus and controls therefor.

Another object is to provide float controls for liquid treatment apparatus in which the float itself is located a sufficient distance above the surface of the liquid to prevent currents and movement of the liquid from interfering with the operation of the float.

An additional object is to provide controls for a pump that pressurizes a tank that prevent short cycling of the pump.

A further object is to provide pressurized liquid containing tanks with controls that facilitate detection and repair of leaks and malfunctioning components.

Another object is to provide a float control valve arrangement that flushes out a pipe that brings liquid to the float.

A further object is to provide a float control valve for large tanks that can be easily changed to operate at different liquid levels in such tanks.

An additional object is to prevent damage to liquid level controls during shipment of the apparatus in which the controls are used.

Another object is to provide for the easy replacement of float control valves in the field.

A further object is to provide the pressure control line, pressure gage and float valve assembly of a liquid treatment tank with pressure through a drop pipe in a way that isolates the pressurized air space in the tank from these components so as to prevent a leak or failure of any of these components from causing the system to shut down as a result of loss of air pressure in the tank.

A further object is to provide liquid level float control valves that are durable, economical, easy to use and to maintain and to repair, and which do not possess defects found in similar prior art float valves.

Other objects and advantages of the liquid treatment controls incorporating this invention will be found in the specification and claims and the scope of the invention will be set forth in the claims.

DESCRIPTION OF THE INVENTION

Figure 1:
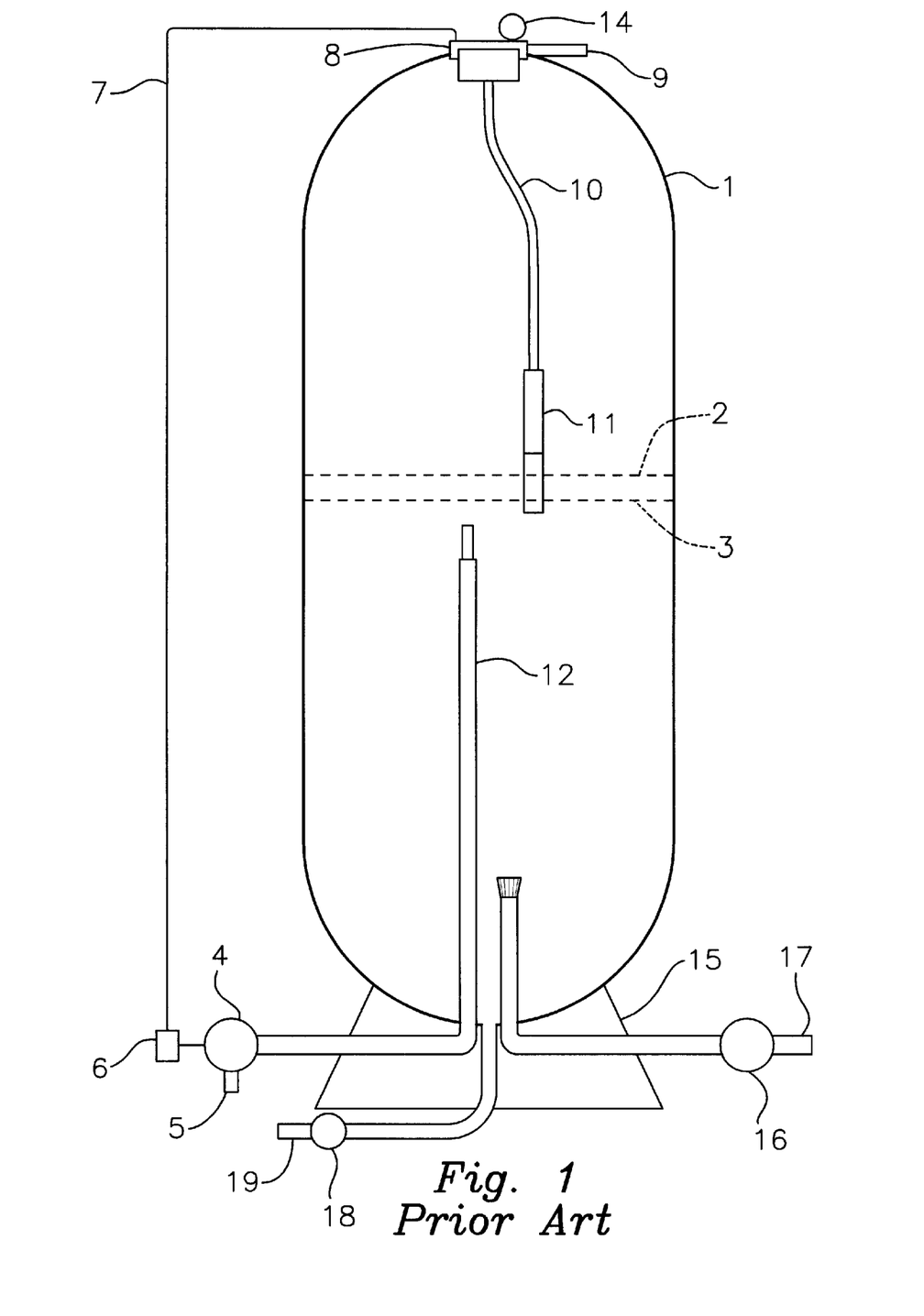
FIG. 1 is a partially cross sectional schematic view of prior art liquid treatment apparatus.

The drawing in FIG. 1 is a simplified depiction of the apparatus for removing hydrogen sulfide from potable water shown in FIG. 1 of my U.S. Pat. Nos. 6,074,562 and 6,080,306. The level of the liquid in a tank 1 fluctuates between an upper level 2 and a lower level 3, leaving an air space in the upper part of the tank. The pressure in tank 1 is maintained at level for treatment (e.g. 60–75 psi) by a liquid pump 4 that is connected to a source 5 of the liquid being treated. The pump 4 is turned on and off by a conventional electrical pressure switch 6 that is connected by an air line 7 to the top of tank 1 through an air line connector 8. An atmospheric air vent 9 is connected to a drop pipe 10 that extends downwardly into a float actuated ballast vent valve 11. The float actuated valve 11 is located at or closely adjacent the liquid level that it controls. The drop pipe 10 is vertically offset from the influent riser pipe 12 to prevent eddies and currents in the tank incoming water supply from interfering with the operation of the float actuated valve 11. Accumulated compressed air in the top of tank 1 lowers the water to the level 3, at which level the float opens valve 11 and releases air to the atmosphere through drop pipe 10 and air vent 9. This lowers the pressure in air line 7 and closes switch 6 and turns on pump 4. The liquid that is pumped in raises the liquid level to the level 2, where the float closes the valve 11. This shuts off the air vent 9, which raises the pressure in the air line 7 and opens switch 6 shutting off the pump 4. A pressure gage 14 may be connected to the tank 1, which may be supported on a stand 15. Hydrogen sulfide may be removed from potable water, and a valve 16 may be used to control the flow of treated water through an effluent pipe 17 and a valve 18 used to control the flushing of precipitated sulfur and waste from tank 1 through a waste pipe 19, as disclosed in my above patents.

Figure 2:
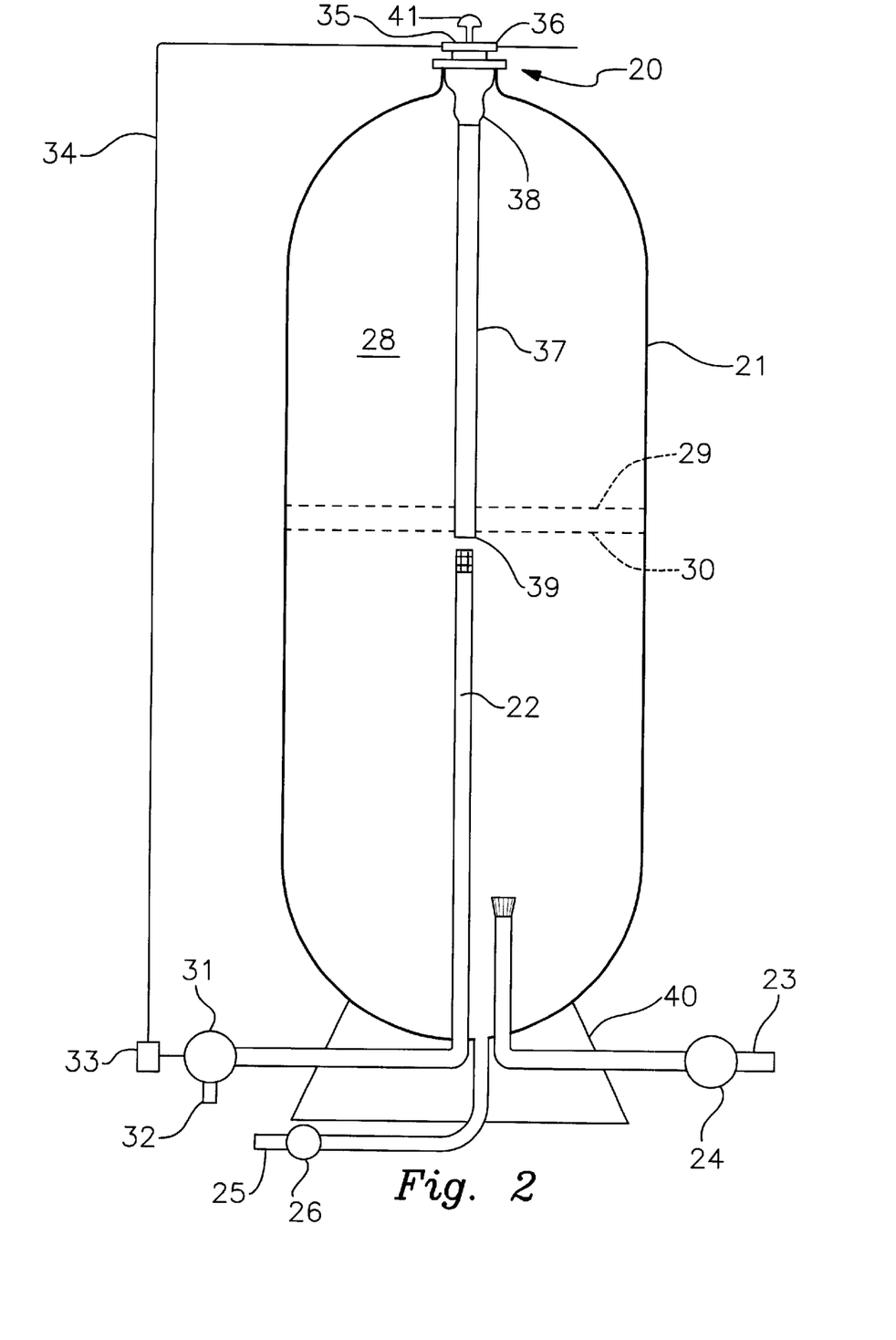
FIG. 2 is a partially cross sectional schematic view of liquid treatment apparatus in accord with this invention.

The invention shown in FIGS. 2–20 improves the apparatus disclosed in my above patents by locating the float in the pressurized air volume control valve a distance remote from the level of the liquid being treated. FIG. 2 shows liquid treatment apparatus that is essentially the same as the prior art disclosed in FIG. 1, except for the structure and operation of the float control valve 20. Incoming liquid to be treated enters a tank 21 through an inlet riser pipe 22. The liquid may be treated as disclosed in my above mention patents, and treated liquid may leave tank 21 through an effluent outlet pipe 23 controlled by a valve 24. Precipitated and waste particles may be flushed from the bottom of tank 21 through a waste outlet pipe 25 controlled by a valve 26.

During the liquid treatment process that takes place in tank 21 an air space 28 is maintained in the upper part of the tank, and the level of the liquid will fluctuate between an upper level 29 and a lower level 30. The pressure in the tank 21 is maintained at the elevated treatment level (e. g. 60–75 psi) by a liquid pump 31 that is connected to the source 32 of untreated liquid, such as potable water containing hydrogen sulfide. The pump 31 is actuated by a conventional electrical pressure switch 33 that is connected by an air line 34 to a removable stopper 35 in control valve 20, which has an atmospheric air vent 36. A straight, hollow, cylindrical drop pipe 37 has its upper terminal end 38 connected to the control valve 20. The pipe 37 extends vertically downwardly so that its lower terminal end 39 is at the level of the liquid in tank 21 directly in line with the inlet riser 22 at the center of the tank. The pipe 37 is completely unobstructed throughout its length, which is many times its diameter (e.g. length 24 inches—diameter 1 inch).

Accumulated compressed air in the top of tank 21 lowers the liquid to the level 30, at which level the control valve 20 opens the air vent 36 and releases air to the atmosphere through drop pipe 37 and the air vent. This lowers the pressure in air line 34 and closes switch 33 which turns on the pump 31. The liquid that is pumped in raises the liquid level to the level 29 which causes water to displace the escaping air in the pipe 37 until liquid reaches a float in the valve 20 and causes the float to rise so as to close the air vent 36. Closing the air vent raises the pressure in the air line 34, which opens switch 33 shutting off the pump 31. Tank 21 may be supported on a stand 40 and may have a pressure gage 41. Hydrogen sulfide may be removed from potable water in tank 1, as disclosed in my above patents.

Figure 3:
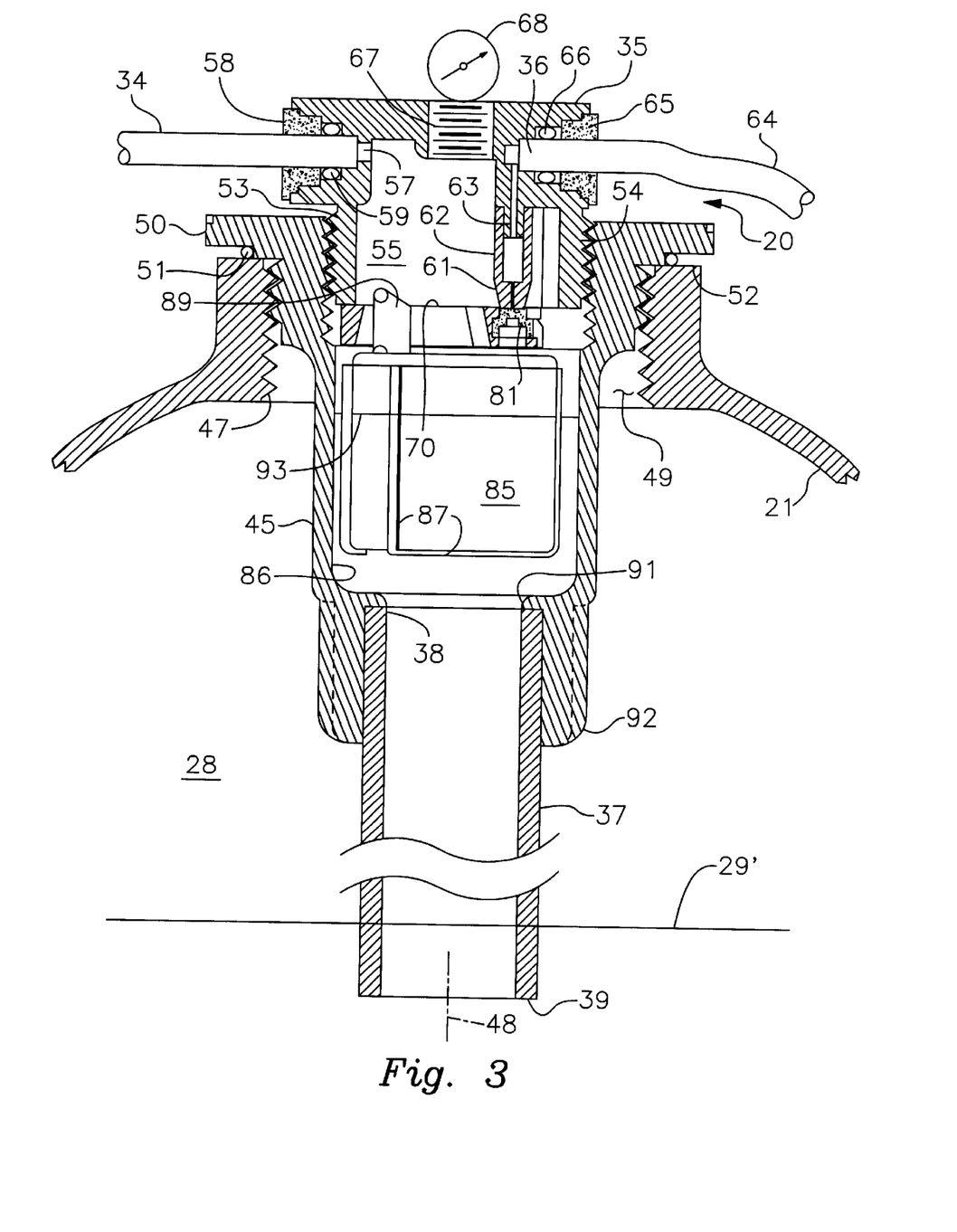
FIG. 3 is an enlarged cross sectional view showing the float control from the embodiment of FIG. 2 in closed position.
Figure 4:
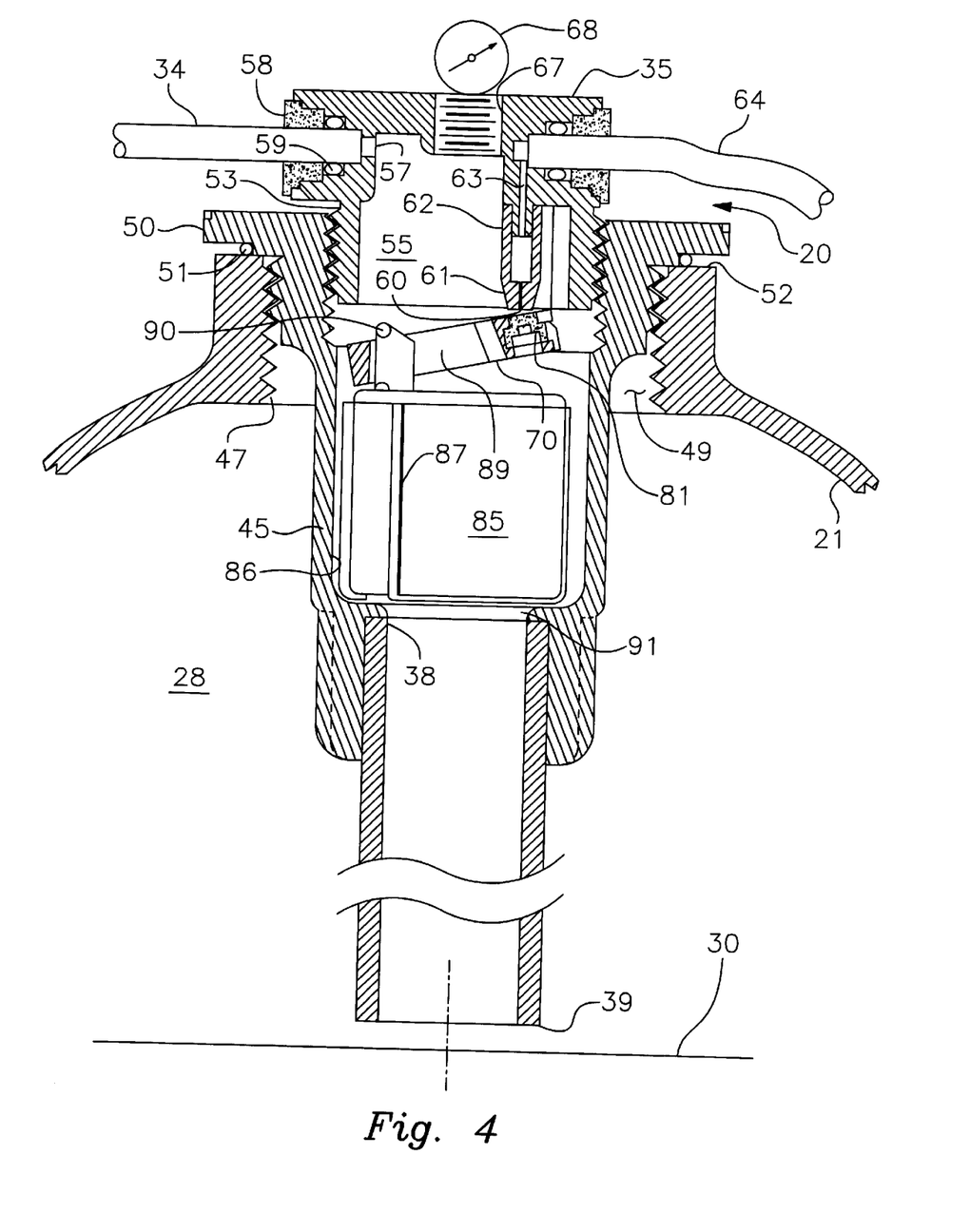
FIG. 4 is an enlarged cross sectional view showing the float control from the embodiment of FIG. 2 in open position.
Figure 5:
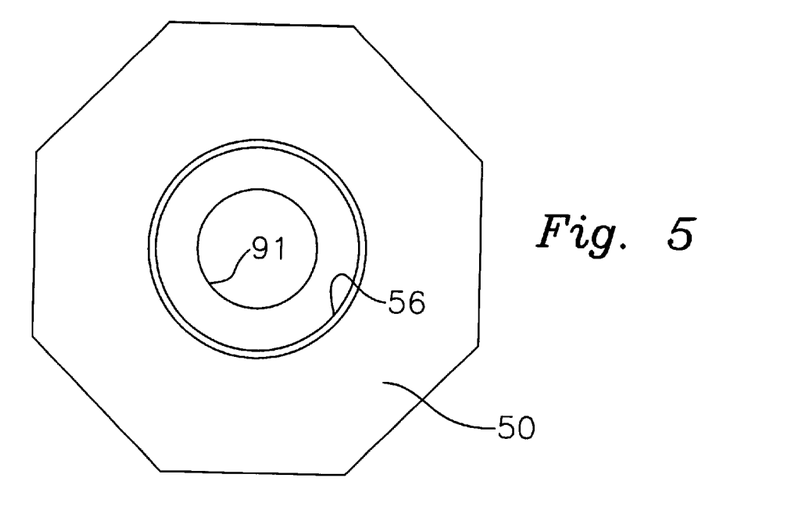
FIG. 5 a top plan view of the main body portion from the embodiment of FIGS. 2 and 3.
Figure 6:
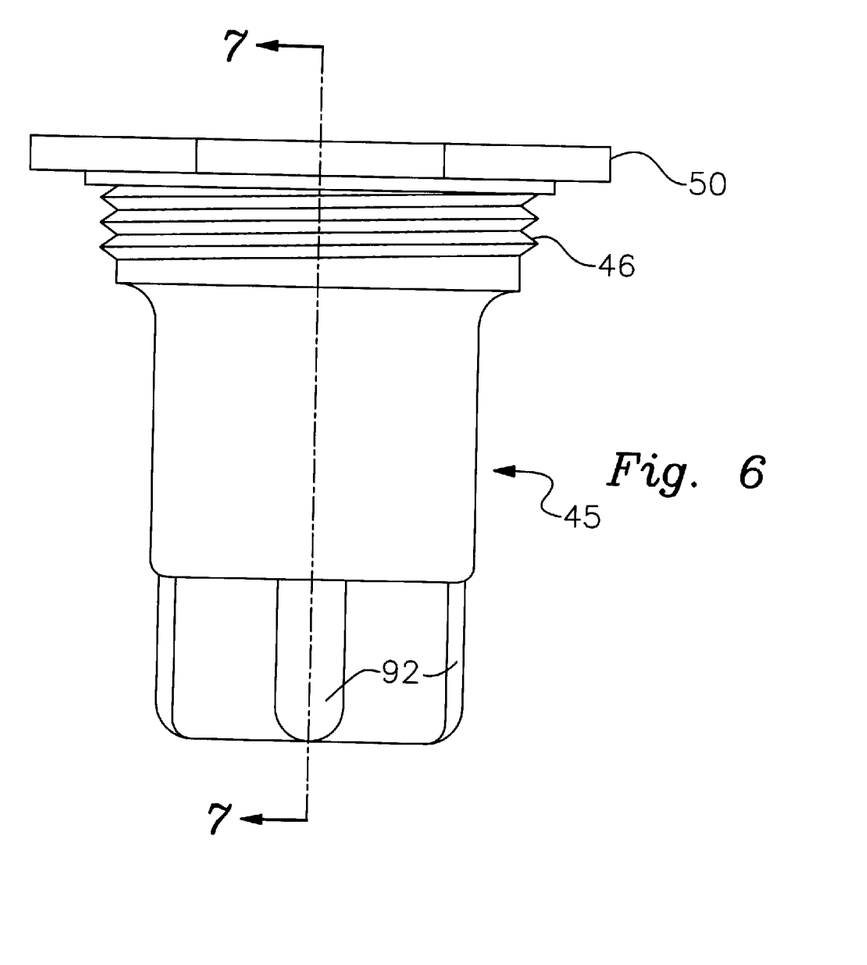
FIG. 6 is a side view of the main body portion
Figure 7:
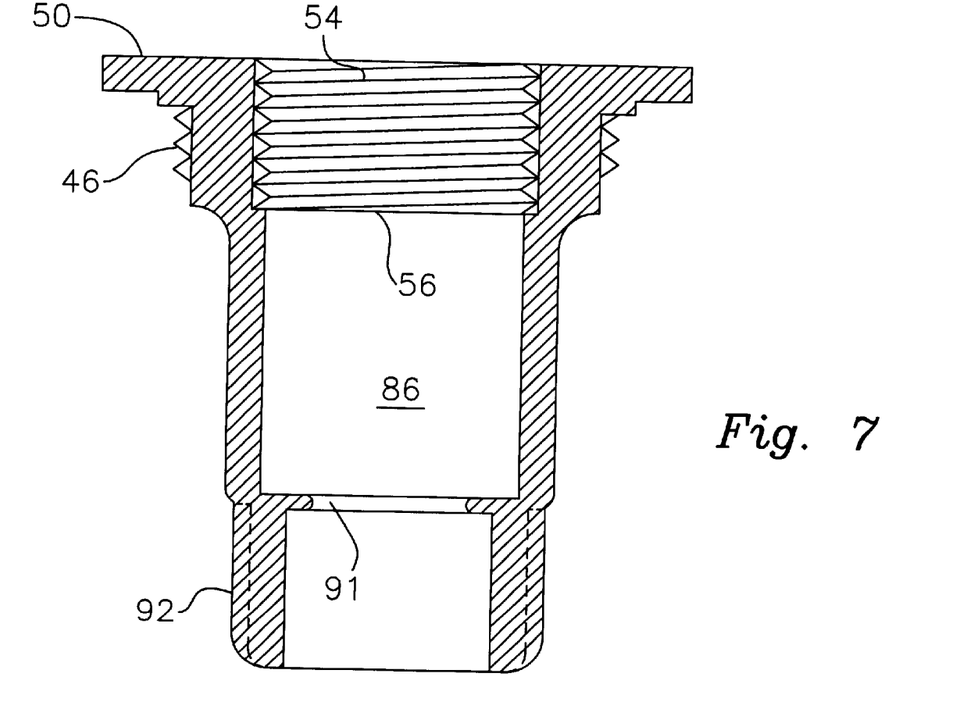
FIG. 7 is a cross sectional view taken along the line 7—7 in FIG. 6.
Figure 8:
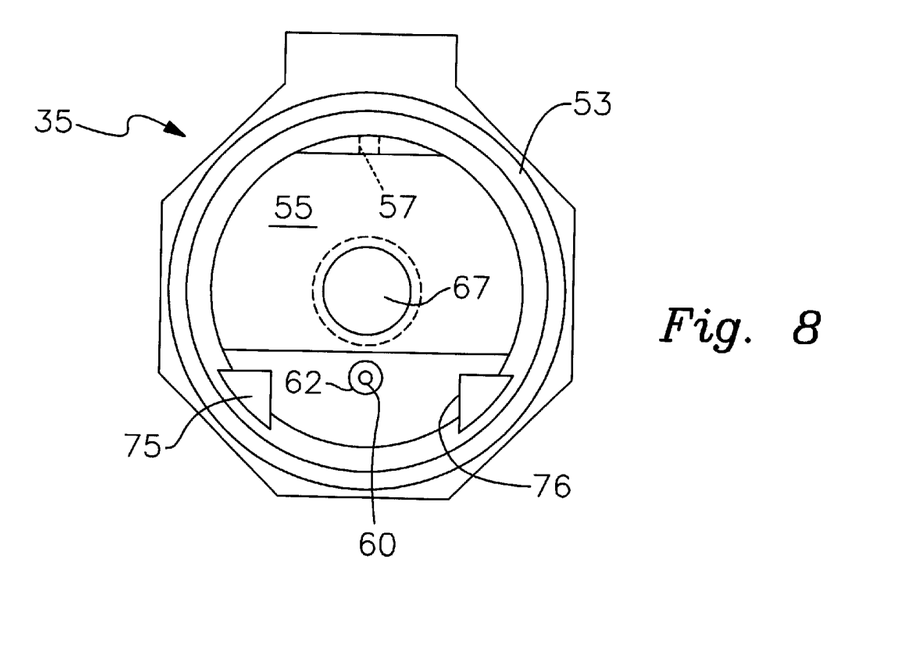
FIG. 8 is a bottom view of the stopper from the embodiments of FIGS. 2 and 3.
Figure 9:
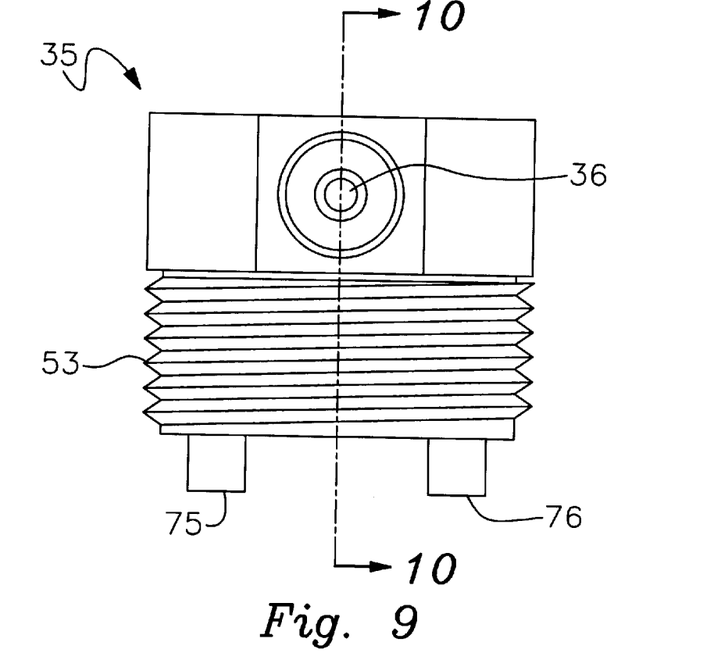
FIG. 9 is a side view of the stopper.
Figure 10:
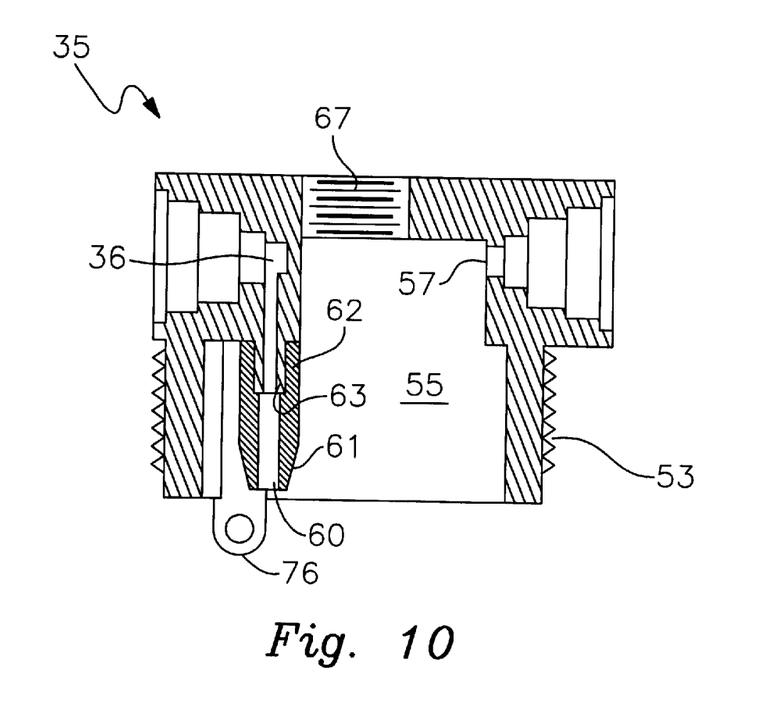
FIG. 10 is a cross sectional view taken along the line 10—10 in FIG. 9.
Figure 11:
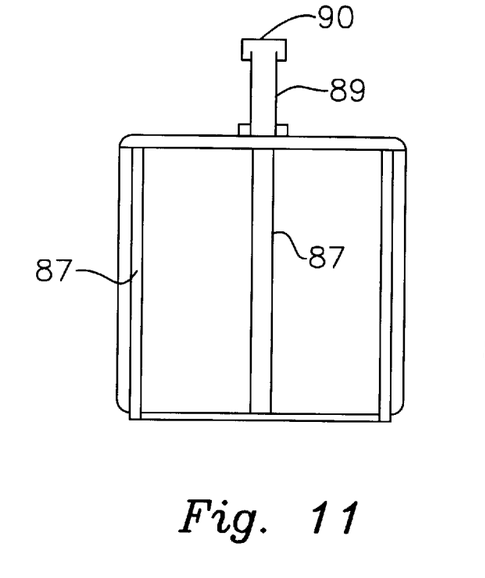
FIG. 11 is front view of the float from the embodiment of FIGS. 2 and 3.
Figure 12:
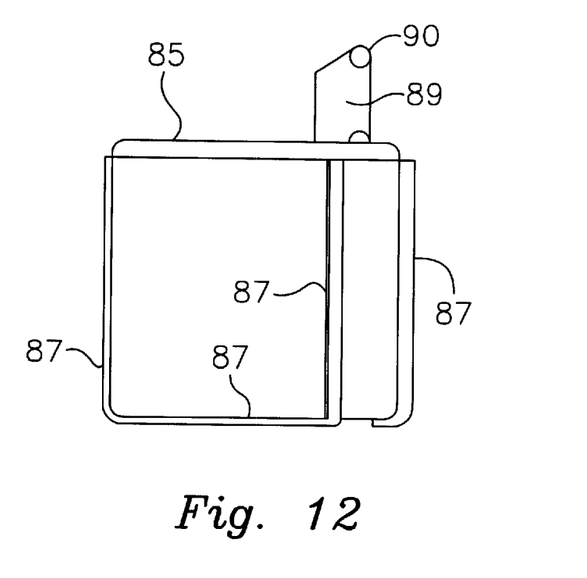
FIG. 12 is a side vie of the float.
Figure 13:
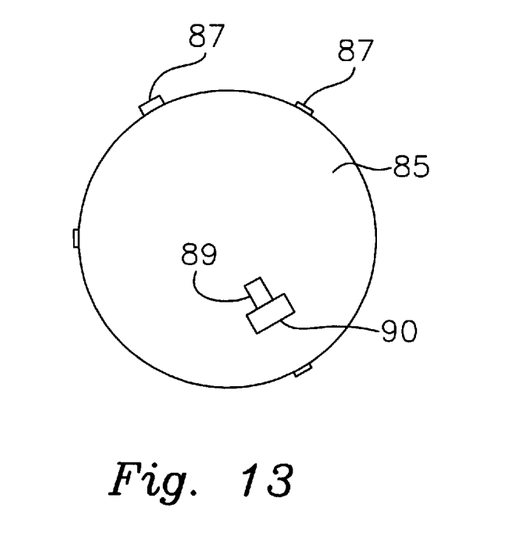
FIG. 13 is a top plan view of the float.
Figure 14:
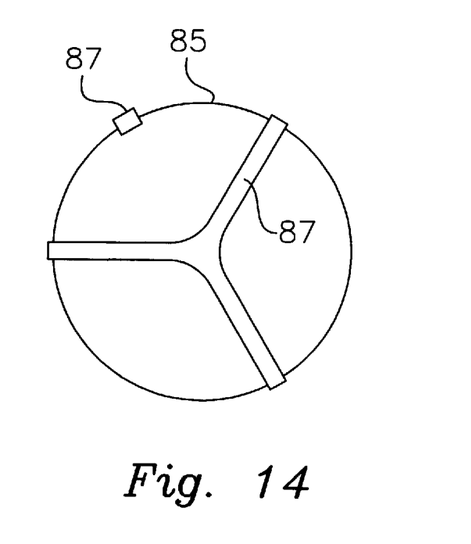
FIG. 14 is a bottom view of the float.
Figure 15:
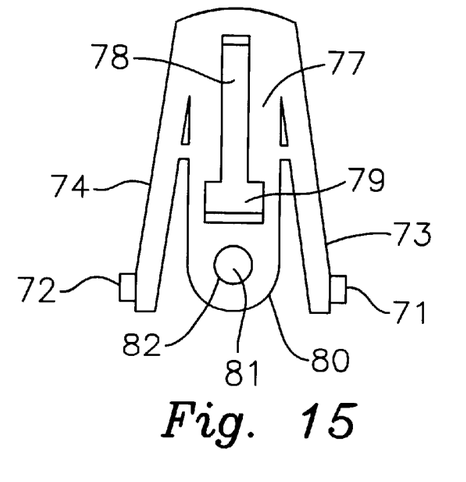
FIG. 15 is a top plan view of the gate from the embodiment of FIGS. 2 and 3.
Figure 16:
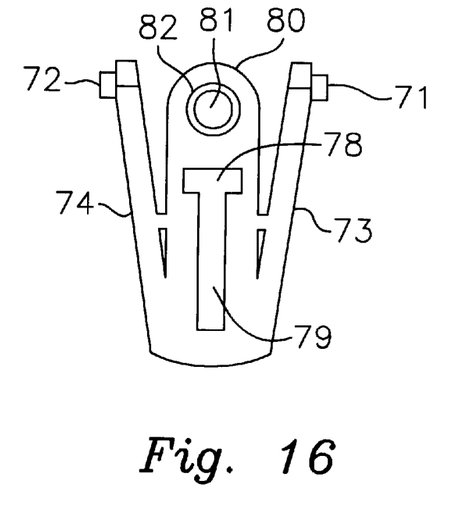
FIG. 16 is a bottom view of the gate.
Figure 17:
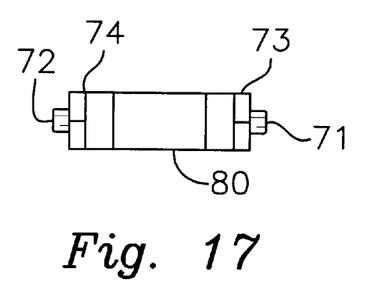
FIG. 17 is a front view of the gate.
Figure 18:
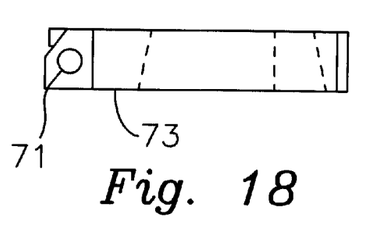
FIG. 18 is a side view of the gate.
Figure 19:
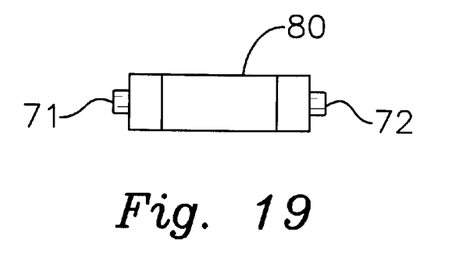
FIG. 19 is a rear view of the gate.
Figure 20:
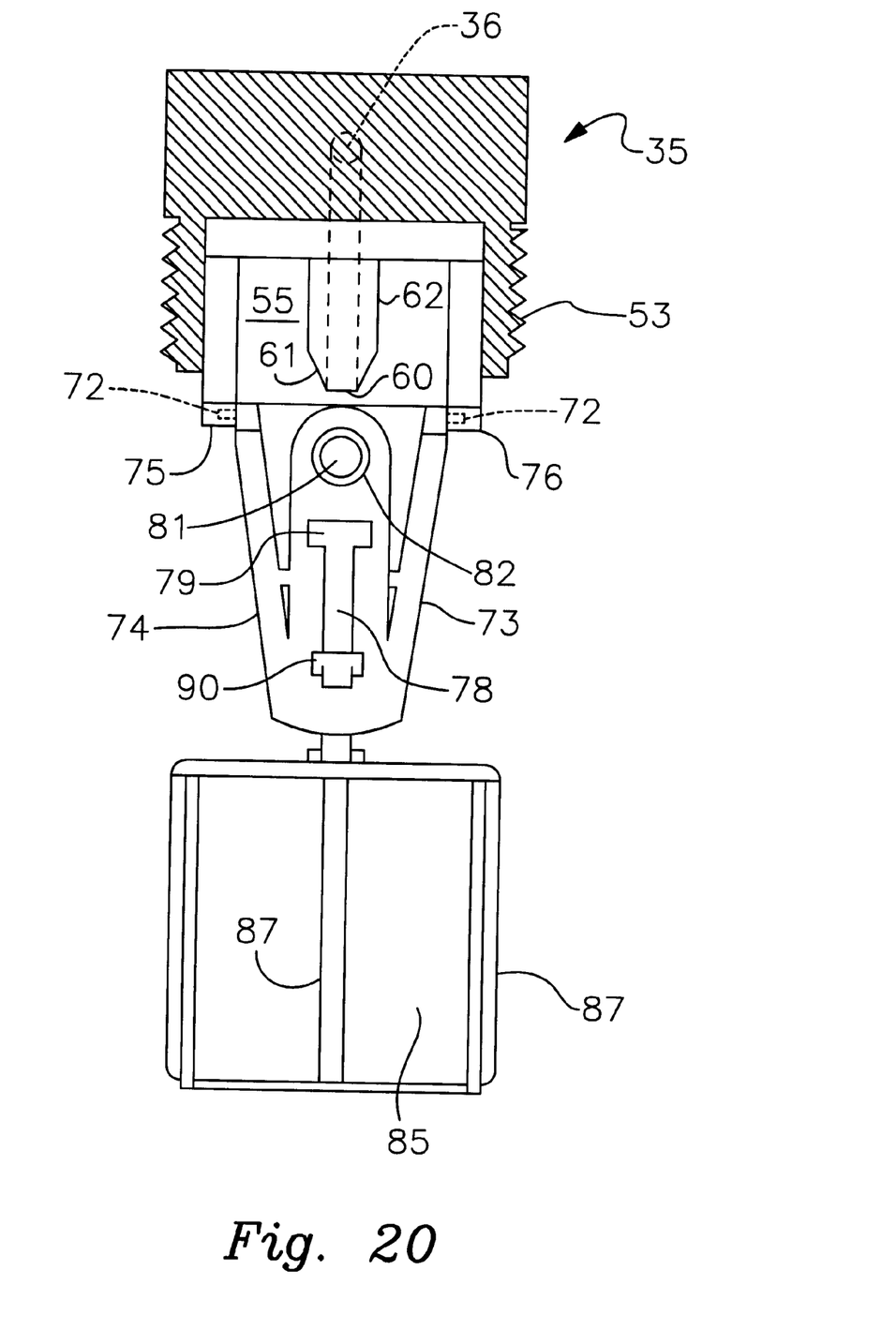
FIG. 20 is a partially cross sectional expanded view showing the float, gate and stopper in assembled relationship.

Valve 20 has a main body portion 45 with external threads 46 that mate with threads 47 in the upper center hole 49 of tank 21, which is centered on the central axis 48 of the tank. A peripheral flange 50 extends from the main body portion, and a gasket 51 is compressed between the flange and the top edge 52 of the tank when the main body portion is screwed into the hole 47. Stopper 35 has external threads 53 that mate with internal threads 54 in a center hole 56 in the main body portion so as to provide a pressure tight fit. Stopper 35 has a hollow interior chamber 55, and air line 34 is pneumatically connected to chamber 55 through a port 57. A grommet 58 and gasket 59 may be used to secure the air line in place. Air vent 36 is connected to chamber 55 through a small hole 60 in the tapered conical end 61 of a nipple 62 that extends downwardly from a stub pipe 63 at the end of the vent. A length of flexible tubing 64 may be a held in vent 36 by a grommet 65 and gasket 66. The tubing 64 is flexible in order to deter intrusion into the valve by insects such as wasps. A threaded hole 67 may be provided in stopper 37 for an air pressure gage 41.

Vent 36 is opened and closed by a movable closure member or gate 70, which has a pair of aligned cylindrical axles 71 and 72 protruding from the ends of opposed arms 73 and 74. Stopper 37 has a pair of aligned bearings 75 and 76 projecting from its lower end. Gate 70 is made from flexible resilient material, so the arms 73 and 74 can be squeezed toward each other, and this enables insertion of the axles 71 and 72 into circular holes in the bearings 75 and 76 so as to pivotally attach an end of the gate to the stopper. Gate 70 has a T-shaped opening 77 with a main slot 78 and cross slot 79 in its center portion 80. A vent closing plastic seal 81 is held in a hole 82 adjacent the end of the center portion.

A hollow cylindrical float 85 moves upwardly and downwardly with the level of liquid in a hydropneumatic float chamber 86 in main body portion 45. The float has several ridges 87 along its sides and bottom to center the float and provide space for liquid to flow around the float in chamber 86. A T-shaped rod 88 extends upwardly from the top of float 85. The stem 89 of the rod 88 is sized to slide in the main slot 78 in gate 70. The cross arm 90 of the rod can be inserted through the cross slot 79, and the movement of the cross arm 90 in the slot 78 will pivotably connect the opposite end of the gate 70 to the float 85. The upper terminal end 38 of pipe 37 is secured in a hole 91 in the bottom of main body portion 45 below float 85. The float chamber 86, internal threads 54 and external threads 46 on the main body portion and the pipe 37 are all coaxial with the central axis 48 of the tank 21, and the vent closing seal 81 is offset from the axis 48. Ridges 92 on the outside of the main body portion strengthen its bottom end in the area where the pipe 37 is attached.

In FIG. 3 the valve 20 is shown in the position that closes the air vent 36. The liquid level 29' is above the level 30, so liquid has filled drop pipe 37 and risen into the float chamber 86. The liquid level 93 in chamber 86 has raised float 85 upwardly and caused gate 70 to pivot upwardly in bearings 75 and 76 until seal 81 bears against the end 61 of nipple 62 and closes hole 60. This seals the vent 36 from the chamber 86, which keeps the pressure in chamber 86 and air line 34 above the set point that opens switch 33 and turns off pump 31.

In FIG. 4 the valve 20 is shown in the position that opens the air vent 36. The liquid level is at the level 30 below the lower terminal end 39 of the pipe 37. The liquid that was in chamber 86 and pipe 37 has drained out into tank 21. The falling liquid has moved float 85 downwardly to the bottom of chamber 86. Lowering of the float has caused the cross arm 90 to pivot the gate 70 downwardly and unseat seal 81 from contact with nipple 62. This has opened hole 60 and pneumatically connected the chambers 55 and 86 to the atmosphere through vent 36. This will lower the pressure in the chambers and air line 34 to the set point that will turn on the pump 3. The pump will run until the liquid rises to the level 29 where liquid in the chamber 86 will raise float 85 and pivot gate 70 to close the vent. Closing vent 36 will raise the pressure in air line 34 until switch 33 shuts off the pump 3.

It has thus been shown that by the practice of this invention, locating the float 85 a significant distance above the uppermost level reached by the liquid in tank 21 prevents the currents and motion of the liquid from interfering with the operation of the control valve 20. When the vent 36 is opened by control valve 20, all of the water drains out of the down pipe 37, and the water must rise for the full length of the pipe 37 before the water can raise float 85 in chamber 86 so as to close the vent and shut off the pump 3. The time lag built in to the control circuit because of the necessity of the emptying and the filling of pipe 37 before the pump 3 will stop and start prevents short cycling of the pump. The emptying of the pipe 37 also flushes out the pipe and prevents precipitates resulting from the treatment process in tank 21 from clogging the pipe 37 or causing the float 85 to malfunction. If experience shows that the liquid levels in any specific treatment tank should be changed after the tank has been installed, this can be accomplished easily by unscrewing the control valve 20 and screwing in another control valve with a different length of pipe 37 that will maintain the new liquid levels. Also, the fact that the float and other components of the control valve 20 are at the top of the tank, and not at the lower end of a long down pipe 37, eliminates torque and stress that could damage the pipe or its joint if sudden or violent movements occur when the apparatus is shipped to the site where it is installed. Isolating the pressure control components at the upper end of the drop pipe 37 also makes detection and repair of leaks easier, and prevents system failure resulting from loss of the air space 28. The float control 20 and its components and attached pipes may be made from any metal or injection moldable plastic usable for potable water service, such as stainless steel or PVC or ABS.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. Liquid treatment apparatus comprising, a pressure tank having a top, a bottom, an inlet for untreated liquid, and an outlet for treated liquid; means for pressurizing said tank so as to provide an air space in an upper part of said tank, said air space defining a level for the liquid in said tank that is below said air space, the level of liquid below said air space rising and falling in response to the pressure in said tank; a control circuit including an air pressure switch for turning said means for pressurizing said tank on and off; an air vent connected to the atmosphere on the outside of said tank; a valve adjacent the top of said tank for opening and closing said air vent in response to the level of the liquid in said tank, said valve having a hydropneumatic chamber adjacent the top of said tank, said air vent being pneumatically connected to said hydropneumatic chamber, an air line pneumatically connecting said pressure switch to said hydropneumatic chamber, a float located in said hydropneumatic chamber, said float being connected to a movable member for opening and closing said air vent, said hydropneumatic chamber having a lower end with an opening therein located below said float, an open-ended pipe having its open upper terminal end in said opening in said hydropneumatic chamber below said float, said pipe having its lower terminal end extending downwardly to the liquid in said tank so that upward and downward movement of the level of the liquid in said tank causes liquid to move into and out of said pipe through said lower terminal end; said pipe being unobstructed between said upper and lower terminal ends, the upward and downward movement of liquid in said pipe causing liquid to move into and out of said hydropneumatic chamber so that movement of liquid into and out of said hydropneumatic chamber raises and lowers said float in said hydropneumatic chamber; lowering of said float in said hydropneumatic chamber causing said movable member to open said air vent to the atmosphere, and the opening of said air vent causing the pressure in said hydropneumatic chamber to fall and thereby to cause the pressure in said air line to fall so as to close said pressure switch and thereby to activate said means for pressurizing said tank.

2. The liquid treatment apparatus defined in claim 1, further comprising the activating of said means for pressurizing said tank causing liquid to rise through said lowermost terminal end of said pipe and flow upwardly into said hydropneumatic chamber, liquid rising in said hydropneumatic chamber causing said float to move upwardly so as to cause said movable member to close said air vent to the atmosphere, and closing of said air vent to the atmosphere causing pressure in said hydropneumatic chamber and in said air line to rise and shut off said means for pressurizing said tank.

3. The liquid treatment apparatus defined in claim 1, wherein said float is pivotally connected to said movable member.

4. The liquid treatment apparatus defined in claim 1, further comprising said tank having a threaded center hole in its top, said air vent and said valve being located in a removable plug that is threaded into said threaded opening so as to seal said tank.

5. The liquid treatment apparatus defined in claim 1, further comprising said valve having a main body portion that has an internal threaded opening in its upper end, a threaded stopper having external threads mating with said internal threads on said main body portion, said stopper having a hollow interior chamber, said air vent being connected to said hollow interior chamber.

6. The liquid treatment apparatus defined in claim 5, wherein said movable member comprise a gate that has one end pivotally attached to said stopper and an opposite end pivotally attached to said float.

7. The liquid treatment apparatus defined in claim 1, further comprising said valve having a main body portion, said main body portion having external threads adjacent its upper end for mating with threads in an opening said tank, and a peripheral flange extending from said main body portion at its top for compressing a gasket around the opening in said tank; said main body portion having an internal threaded opening in its upper end, a threaded stopper having external threads mating with said internal threads on said main body portion, said stopper having a hollow interior chamber, said air vent and said air line being connected to said hollow interior chamber; and said internal and external threaded openings of said main body portion and said hydropneumatic chamber and said unobstructed pipe being coaxial with the central axis of said tank.

8. Liquid treatment apparatus comprising, a pressurized liquid treatment tank, and means including an air pressure actuated switch for pressurizing said tank so as to provide an air space in an upper part of said tank, said air space defining a level for the liquid in said tank that is below said air space; a valve adjacent the top of said tank for operating said air pressure actuated switch and activating said means for pressurizing said tank in response to the level of the liquid in said tank, said valve having a hydropneumatic chamber adjacent the top of said tank, an atmospheric vent pneumatically connected to said hydropneumatic chamber, a float located in said hydropneumatic chamber, said float having its upper end connected to a gate that opens and closes said atmospheric vent, said hydropneumatic chamber having an opening in its lower end located below said float, an open-ended pipe having its open upper terminal end in said opening in said hydropneumatic chamber below said float, said pipe having its lower terminal end extending downwardly to the liquid in said tank so that upward and downward movement of the level of the liquid in said tank causes liquid to move into and out of said pipe through its lowermost terminal end; the upward and downward movement of liquid in said pipe causing liquid to move into and out of said hydropneumatic chamber so as to raise and lower said float in said hydropneumatic chamber; lowering of said float in said hydropneumatic chamber causing said gate to open said atmospheric vent, the opening of said atmospheric vent causing the pressure in said hydropneumatic chamber to fall so as to cause said air pressure actuated switch to activate said means for pressurizing said tank, and the activating of said means for pressurizing said tank causing liquid to rise through said lowermost terminal end of said pipe and flow onto said hydropneumatic chamber, liquid rising in said hydropneumatic chamber causing said float to move upwardly so as to cause said gate to close said atmospheric vent, and closing of said atmospheric vent causing pressure in said hydropneumatic chamber to rise so as to cause said air pressure actuated switch to shut off said means for pressurizing said tank.

9. The liquid treatment apparatus defined in claim 8, wherein said float is pivotally connected to said gate.

10. The liquid treatment apparatus defined in claim 8, further comprising said tank having a threaded center hole in its top, said air vent and said valve being located in a removable plug that is threaded into said threaded opening so as to seal said tank.

11. The liquid treatment apparatus defined in claim 8, further comprising said valve having a main body portion, said main body portion having an internal threaded opening in its upper end, a threaded stopper having external threads mating with said internal threads on said main body portion, said stopper having a hollow interior chamber, said atmospheric vent being connected to said hollow interior chamber.

12. The liquid treatment apparatus defined in claim 11, further comprising said gate having one end pivotally attached to said stopper and an opposite end pivotally attached to said float.

13. The liquid treatment apparatus defined in claim 8, further comprising said valve having a main body portion, said main body portion having external threads adjacent its upper end for mating with threads in an opening said tank, a peripheral flange extending from said main body portion at its top for compressing a gasket around the opening in said tank; said main body portion having an internal threaded opening in its upper end, a threaded stopper having external threads mating with said internal threads on said main body portion, said stopper having a hollow interior chamber, said atmospheric vent being connected to said hollow interior chamber; said gate having one end pivotally attached to said stopper and an opposite end pivotally attached to said float.

14. A float valve for controlling the pressure in a pressurized liquid containing tank in response to the level of the liquid in said tank, comprising a main body portion having a central axis, said main body portion having external threads adjacent its upper end for mating with threads in an opening in said tank and a peripheral flange extending from said main body portion above said external threads for compressing a gasket around the opening in said tank, said main body portion having an internally threaded opening in its upper end, a removable stopper having external threads mating with the internal threads in said main body portion, said stopper having a hollow interior chamber, a port in said hollow interior chamber for pneumatically connecting said hollow interior chamber to means for controlling the pressure in said tank, said main body portion having an internal float chamber therein, a float in said float chamber that is movable upwardly and downwardly along said central axis in response to movement of liquid in said float chamber, an opening in said main body portion communicating with said float chamber below said float, a vertical open-ended hollow unobstructed cylindrical pipe having its upper end in said opening below said float for enabling liquid from said tank to move upwardly and downwardly into and out of said float chamber and thereby to raise and lower said float in said float chamber, a vent in said stopper connecting said float chamber to the atmosphere, said vent bypassing said hollow internal chamber, a gate in said float chamber below said stopper for opening and closing said vent in response to changes of the level of the liquid in said float chamber, said gate having one end pivotally attached to said float, the internally and externally threaded openings of said main body portion and said float chamber and said unobstructed pipe being coaxial with said central axis of said main body portion, said float chamber being pneumatically connected through said port in said stopper to said means for controlling the pressure in said tank so as to maintain the pressure in said tank in response to the opening and closing of said vent by upward and downward movement of said float along said central axis.

15. The float valve defined in claim 14 wherein said gate has an end opposite to said one end that pivotally connected to said stopper.

16. The float valve defined in claim 14 wherein said gate is removably attached to said stopper.

17. The float valve defined in claim 14 wherein said vent includes a downwardly extending hollow nipple that provides a seat for said gate for closing said vent.

18. The float valve defined in claim 14 wherein said hollow nipple is parallel to said central axis of said main body portion.

* * * * *